(12) United States Patent
Minami et al.

(10) Patent No.: US 9,068,523 B2
(45) Date of Patent: Jun. 30, 2015

(54) CONTROL APPARATUS FOR INTERNAL COMBUSTION ENGINE

(75) Inventors: Keitarou Minami, Kariya (JP); Hideaki Ichihara, Obu (JP); Hiroyuki Takezoe, Kariya (JP); Hiroshi Katsurahara, Okazaki (JP)

(73) Assignee: DENSO CORPORATION, Kariya (JP)

( * ) Notice: Subject to any disclaimer, the term of this patent is extended or adjusted under 35 U.S.C. 154(b) by 423 days.

(21) Appl. No.: 13/480,583

(22) Filed: May 25, 2012

(65) Prior Publication Data

US 2012/0303247 A1    Nov. 29, 2012

(30) Foreign Application Priority Data

May 27, 2011 (JP) .................................. 2011-119727
Apr. 2, 2012 (JP) .................................. 2012-083690

(51) Int. Cl.
| F02D 41/26 | (2006.01) |
| F02D 41/00 | (2006.01) |
| F02D 41/14 | (2006.01) |
| G01M 15/11 | (2006.01) |
| F02M 25/07 | (2006.01) |

(52) U.S. Cl.
CPC ........ *F02D 41/0072* (2013.01); *F02D 41/0052* (2013.01); *F02D 41/1497* (2013.01); *F02D 2200/1015* (2013.01); *Y02T 10/47* (2013.01); *G01M 15/11* (2013.01)

(58) Field of Classification Search
CPC . F02D 41/005; F02D 41/006; F02D 41/0072; F02D 41/083; F02D 41/123; F02M 25/0786
USPC ............ 123/568.21, 568.23, 568.25, 568.26; 701/101–105, 108, 112
See application file for complete search history.

(56) References Cited

U.S. PATENT DOCUMENTS

| 6,006,157 | A | 12/1999 | Dai et al. | |
| 2006/0217872 | A1 | 9/2006 | Moriya et al. | |
| 2009/0234562 | A1* | 9/2009 | Wolf et al. | ..................... 701/108 |
| 2013/0090839 | A1* | 4/2013 | Ishigami et al. | .............. 701/108 |

FOREIGN PATENT DOCUMENTS

| JP | 8-61112 | 3/1996 |
| JP | 8-144803 | 6/1996 |
| JP | 2008-31861 | 2/2008 |

(Continued)

OTHER PUBLICATIONS

U.S. Appl. No. 13/481,192 of Minami et al, filed May 25, 2012.
U.S. Appl. No. 13/481,231 of Nogami et al, filed May 25, 2012.

(Continued)

*Primary Examiner* — Hieu T Vo
*Assistant Examiner* — Arnold Castro
(74) *Attorney, Agent, or Firm* — Nixon & Vanderhye PC

(57) ABSTRACT

A cylinder-inflow EGR gas quantity determining arrangement estimates or senses a value of a cylinder-inflow EGR gas quantity, which is a quantity of EGR gas that flows into a cylinder of an internal combustion engine. A misfire predicting arrangement predicts whether misfire occurs based on the value of the cylinder-inflow EGR gas quantity and an operational state of the internal combustion engine. A misfire-avoidance control arrangement executes at least one misfire-avoidance control operation to avoid the misfire when the misfire predicting arrangement predicts that the misfire occurs.

6 Claims, 10 Drawing Sheets

(56) References Cited

FOREIGN PATENT DOCUMENTS

| JP | 2008-101626 | 5/2008 | | |
|----|----|----|----|----|
| JP | 2010-1796 | 1/2010 | | |
| JP | 2010-36780 | 2/2010 | | |
| JP | 2010-053716 | 3/2010 | | |
| JP | 2010-203281 | 9/2010 | | |
| WO | WO 2011161980 A1 | * | 12/2011 | ............ 701/108 |

OTHER PUBLICATIONS

U.S. Appl. No. 13/480,641 of Takezoe et al, filed May 25 2012.
Office Action (6 pages) dated Sep. 2, 2014, issued in corresponding Chinese Application No. 201210167064.1 and English translation (8 pages).
Office Action (3 pages) dated Apr. 13, 2015, issued in corresponding Japanese Application No. 2012-083690 and English translation (5 pages).

* cited by examiner

FIG. 5

MISFIRE-AVOIDANCE CONTROL OPERATION SELECTION MAP

| MISFIRE-AVOIDANCE CTRL. | EXPECTED INCREASE OF UPPER LIMIT INFLOW EGR GAS QTY. | FUEL ECONOMY DETERIORATION DEGREE | DRIVEABILITY DETERIORATION DEGREE | RESPONSIVENESS DETERIORATION DEGREE | EMISSION DETERIORATION DEGREE |
|---|---|---|---|---|---|
| (a) | 3 | 3 | 2 | 1 | 2 |
| (b) | 2 | 2 | 1 | 2 | 3 |
| (c) | 4 | 3 | 3 | 1 | 1 |
| (d) | 2 | 1 | 1 | 2 | 3 |
| ... | ... | ... | ... | ... | ... |

CONTROL APPARATUS FOR INTERNAL COMBUSTION ENGINE

CROSS REFERENCE TO RELATED APPLICATION

This application is based on and incorporates herein by reference Japanese Patent Application No. 2011-119727 filed on May 27, 2011 and Japanese Patent Application No. 2012-83690 filed on Apr. 2, 2012.

TECHNICAL FIELD

The present disclosure relates to a control apparatus for an internal combustion engine provided with an EGR device.

BACKGROUND

There is known an internal combustion engine of a vehicle, which is provided with an EGR device to recirculate a portion of exhaust gas as EGR gas to an intake passage for the purpose of improving fuel consumption and reducing knocking and exhaust emissions of the internal combustion engine.

However, in the internal combustion engine, which is provided with the EGR device, even when an EGR valve is closed at the time of driving a throttle valve to a closing side thereof (at the time of controlling an opening degree of the throttle valve to a closing side), the EGR gas may remain in a portion of an EGR passage located on a downstream side of the EGR valve or in the intake passage in a system. Particularly in a system, which recirculates the EGR gas to a portion of the intake passage located on the upstream side of the throttle valve, a large quantity of the EGR gas may remain in the portion of the intake passage located on the upstream side of the throttle valve. Therefore, in such a system, the quantity of the EGR gas, which flows into a cylinder of the internal combustion engine at the time of decelerating the engine (thereby decelerating the vehicle) or the time of reaccelerating the engine (thereby reaccelerating the vehicle), may be excessively increased to cause a deterioration of a combustion state, thereby possibly resulting in occurrence of misfire.

In view of the above point, JP2010-36780A teaches a technique of limiting combustion deterioration in the internal combustion engine. Specifically, according to the technique of JP2010-36780A, a throttle valve is closed at a speed that is slower than an upper limit valve closing speed, above which the misfire will likely occur (i.e., the throttle opening degree being reduced at a speed that is lower than an upper limit closing speed, above which the misfire will likely occur). In this way, the combustion deterioration is limited.

Here, it should be noted that depending on the operational state immediately before the time of decelerating the engine, a large quantity of EGR gas may be already present in the intake passage at the time of starting the deceleration of the engine. However, technique of JP2010-36780A is a technique that limits the suctioning of the EGR gas by closing the throttle valve at the speed, which is lower than the upper limit closing speed of the throttle valve, and thereby limiting a rapid decrease of the intake conduit pressure (a rapid increase of an intake conduit negative pressure). In the case where the large quantity of EGR gas is already present in the intake passage at the time of starting the deceleration of the engine, the quantity of the EGR gas, which flows into the cylinder, becomes excessively large according to this technique, thereby possibly resulting in misfire. Furthermore, the above technique cannot counteract with a case where the EGR gas remains in the intake passage until the time of reaccelerating the engine after the execution of the deceleration of the engine, thereby possibly resulting in occurrence of misfire at the time of reacceleration of the engine.

SUMMARY

The present disclosure addresses the above disadvantages.

According to the present disclosure, there is provided a control apparatus for an internal combustion engine that is provided with an exhaust gas recirculation (EGR) device, which recirculates a portion of exhaust gas of the internal combustion engine as EGR gas to an intake passage of the internal combustion engine. The control apparatus includes a cylinder-inflow EGR gas quantity determining arrangement, a misfire predicting arrangement and a misfire-avoidance control arrangement. The cylinder-inflow EGR gas quantity determining arrangement estimates or senses a value of a cylinder-inflow EGR gas quantity, which is a quantity of the EGR gas that flows into a cylinder of the internal combustion engine. The misfire predicting arrangement predicts whether misfire occurs based on the value of the cylinder-inflow EGR gas quantity and an operational state of the internal combustion engine. The misfire-avoidance control arrangement executes at least one misfire-avoidance control operation to avoid the misfire when the misfire predicting arrangement predicts that the misfire occurs.

The cylinder-inflow EGR gas quantity determining arrangement may estimate the value of the cylinder-inflow EGR gas quantity based on an EGR valve-passing gas flow quantity, which is a quantity of a portion of the EGR gas that passes through an EGR valve of the EGR device. The misfire predicting arrangement may compare the estimated value of the cylinder-inflow EGR gas quantity with an upper limit inflow EGR gas quantity to predict whether the misfire occurs in advance before the portion of the EGR gas, which corresponds to the estimated value of the cylinder-inflow EGR gas quantity, flows into the cylinder to provide an execution time period to the misfire-avoidance control arrangement for executing the at least one misfire-avoidance control operation before the portion of the EGR gas flows into the cylinder in a case where the misfire predicting arrangement predicts that the misfire occurs.

Additionally or alternatively, the cylinder-inflow EGR gas quantity determining arrangement may estimate and store a value of an EGR gas flow quantity of a portion of the EGR gas that is present between a first location of the intake passage, which is on a downstream side of the EGR valve of the EGR device, and a second location of the intake passage, which is on an upstream side of the cylinder, based on an EGR valve-passing gas flow quantity, which is a quantity of the portion of the EGR gas passed through the EGR valve. The cylinder-inflow EGR gas quantity determining arrangement may estimate the value of the cylinder-inflow EGR gas quantity based on the stored value of the EGR gas flow quantity of the portion of the EGR gas.

BRIEF DESCRIPTION OF THE DRAWINGS

The drawings described herein are for illustration purposes only and are not intended to limit the scope of the present disclosure in any way.

FIG. 5 is a diagram schematically showing an example of a misfire-avoidance control operation selection map according to the embodiment;

DETAILED DESCRIPTION

An embodiment of the present disclosure will be described with reference to the accompanying drawings.

Figure 1:
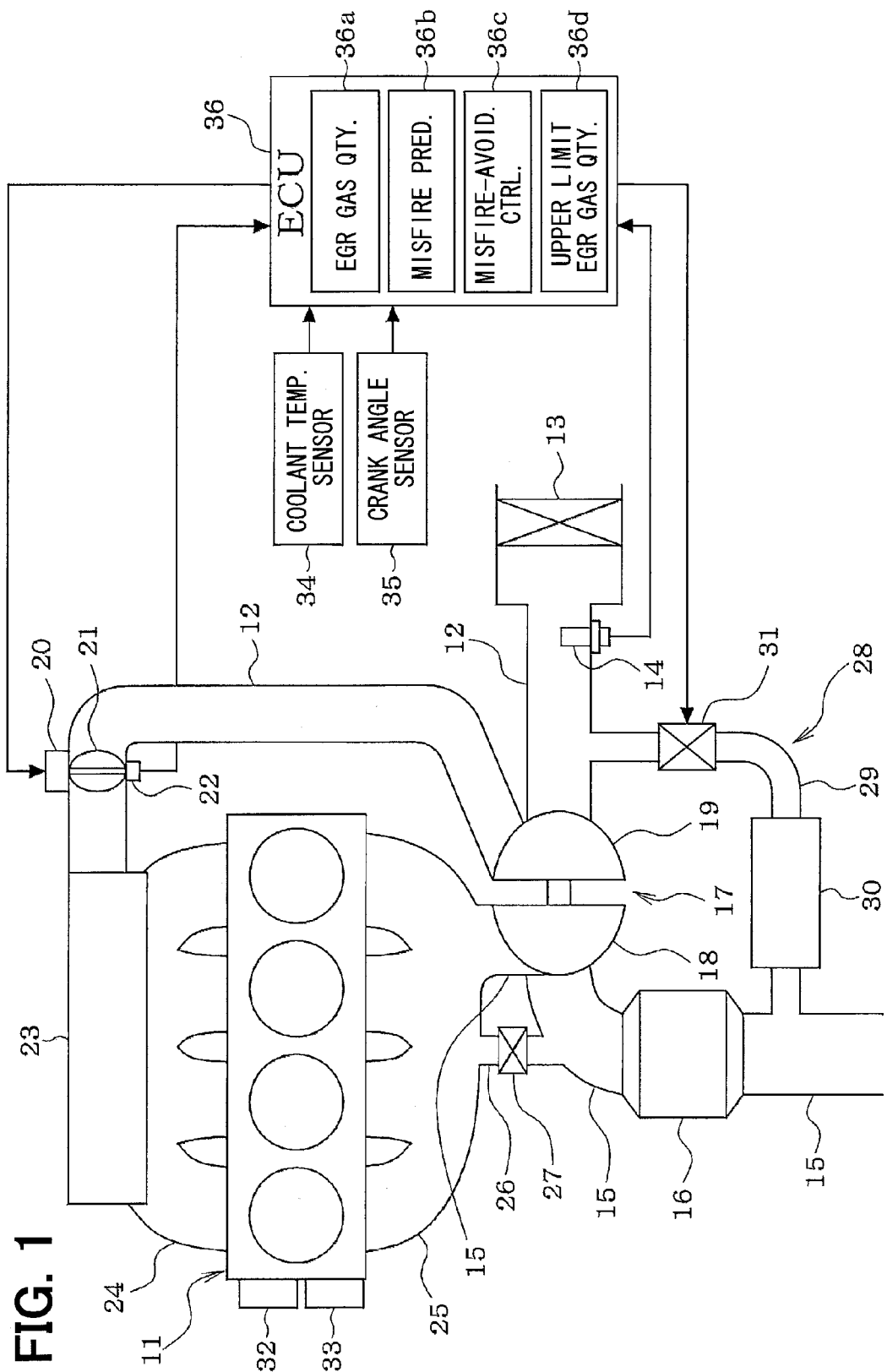
FIG. 1 is a schematic diagram showing a structure of an engine control system, which controls an internal combustion engine provided with a supercharger, according to an embodiment of the present disclosure.

First of all, a structure of an engine control system, which controls an internal combustion engine provided with a supercharger, will be described with reference to FIG. 1.

An air cleaner 13 is placed at a furthermost upstream portion of an intake conduit 12 (an intake passage) of the internal combustion engine (hereinafter simply referred to as the engine) 11. An air flow meter 14 is placed in the intake conduit 12 on the downstream side of the air cleaner 13 in a flow direction of the intake air to sense a flow quantity of the intake air (fresh air). A catalytic converter (e.g., a three-way catalytic converter) 16 is placed in an exhaust conduit 15 (an exhaust passage) of the engine 11 to purify the exhaust gas by converting noxious substances, such as carbon monoxide (CO), hydrocarbon (HC) and nitrogen oxide (NOx) of the exhaust gas into less noxious substances.

An exhaust turbine supercharger 17, which supercharges the intake air, is provided to the engine 11. An exhaust turbine 18 of the supercharger 17 is placed on an upstream side of the catalytic converter 16 in a flow direction of exhaust gas in the exhaust conduit 15. A compressor 19 of the supercharger 17 is placed on a downstream side of the air flow meter 14 in the intake conduit 12. In the supercharger 17, the exhaust turbine 18 and the compressor 19 are coupled with each other to rotate integrally. When the exhaust turbine 18 is rotated by a kinetic energy of the exhaust gas, the compressor 19 is rotated to supercharge the intake air.

A throttle valve 21 and a throttle opening degree sensor 22 are placed on a downstream side of the compressor 19 in the intake conduit 12. The throttle valve 21 is driven by an electric motor 20 to adjust an opening degree thereof. The throttle opening degree sensor 22 senses the opening degree (a throttle opening degree) of the throttle valve 21.

An intercooler, which cools the intake air, is provided integrally with a surge tank 23 (the intake passage) at a location that is on a downstream side of the throttle valve 21. Here, it should be noted that the intercooler may be placed on an upstream side of the surge tank 23 and/or the throttle valve 21, if desired. An intake manifold 24 (the intake passage), which guides the air into the respective cylinders of the engine 11, is provided to the surge tank 23. Furthermore, fuel injection valves (not shown) are provided for the cylinders such that each fuel injection valve (not shown) is adapted to inject fuel into the corresponding cylinder or a corresponding intake port associated with the cylinder. Spark plugs (not shown) are provided for the cylinders, respectively, and are installed to a cylinder head of the engine 11. A mixture of fuel and air in each cylinder is ignited through spark discharge of the spark plug.

An exhaust manifold 25 is connected to an exhaust opening of each cylinder of the engine 11, and a downstream side merging portion of the exhaust manifold 25 is connected to a portion of the exhaust conduit 15, which is located on an upstream side of the exhaust turbine 18. An exhaust gas bypass passage 26 bypasses the exhaust turbine 18 by connecting between a portion of the exhaust manifold 25, which is located on an upstream side of the exhaust turbine 18, and a portion of the exhaust conduit 15, which is located on a downstream side of the exhaust turbine 18. A wastegate valve 27 is installed in the exhaust gas bypass passage 26 to open or close the exhaust gas bypass passage 26.

A low pressure loop exhaust gas recirculation (LPL EGR) device 28 is provided to the engine 11. The EGR device 28 recirculates a part of the exhaust gas as EGR gas from the exhaust conduit 15 into the intake conduit 12. In the EGR device 28, an EGR conduit 29 (an EGR passage) connects between a portion of the exhaust conduit 15, which is located on a downstream side of the catalytic converter 16, and a portion of the intake conduit 12, which is located on an upstream side of the compressor 19. An EGR cooler 30 and an EGR valve 31 are provided in the EGR conduit 29. The EGR cooler 30 cools the EGR gas. The EGR valve 31 adjusts a flow quantity (EGR gas flow quantity) of the EGR gas, which flows through the EGR conduit 29. An opening degree of the EGR valve 31 is adjusted by an actuator (not shown), such as an electric motor. When the EGR valve 31 is opened, the EGR gas is recirculated from the portion of the exhaust conduit 15, which is located on the downstream side of the catalytic converter 16, to the portion of the intake conduit 12, which is located on the upstream side of the compressor 19.

Furthermore, an intake side variable valve timing mechanism 32 and an exhaust side variable valve timing mechanism 33 are provided to the engine 11. The intake side variable valve timing mechanism 32 adjusts, i.e., changes valve timing (opening timing and closing timing) of intake valves (not shown). The exhaust side variable valve timing mechanism 33 adjusts, i.e., changes the valve timing of exhaust valves (not shown). Furthermore, a coolant temperature sensor 34 and a crank angle sensor 35 are provided to the engine 11. The coolant temperature sensor 34 senses the temperature of engine coolant, which is circulated to cool the engine 11. The crank angle sensor 35 outputs a pulse signal at every predetermined crank angle upon rotation of a crankshaft (not shown). A crank angle and an engine rotational speed are sensed, i.e., are determined based on the output signals of the crank angle sensor 35.

Outputs of the above-described sensors are supplied to an electronic control unit (ECU) 36. The ECU 36 includes a microcomputer as its main component. When the ECU 36 executes engine control programs, which are stored in a ROM (a storage) of the ECU 36, for example, a fuel injection quantity of each fuel injection valve, ignition timing of each spark plug and the opening degree of the throttle valve 21 (an intake air quantity) are controlled based on the engine operational state.

At that time, the ECU 36 computes a target EGR rate based on an engine operational state (e.g., an engine load and the engine rotational speed) and controls the opening degree of the EGR valve 31 to implement the target EGR rate.

Figure 2:
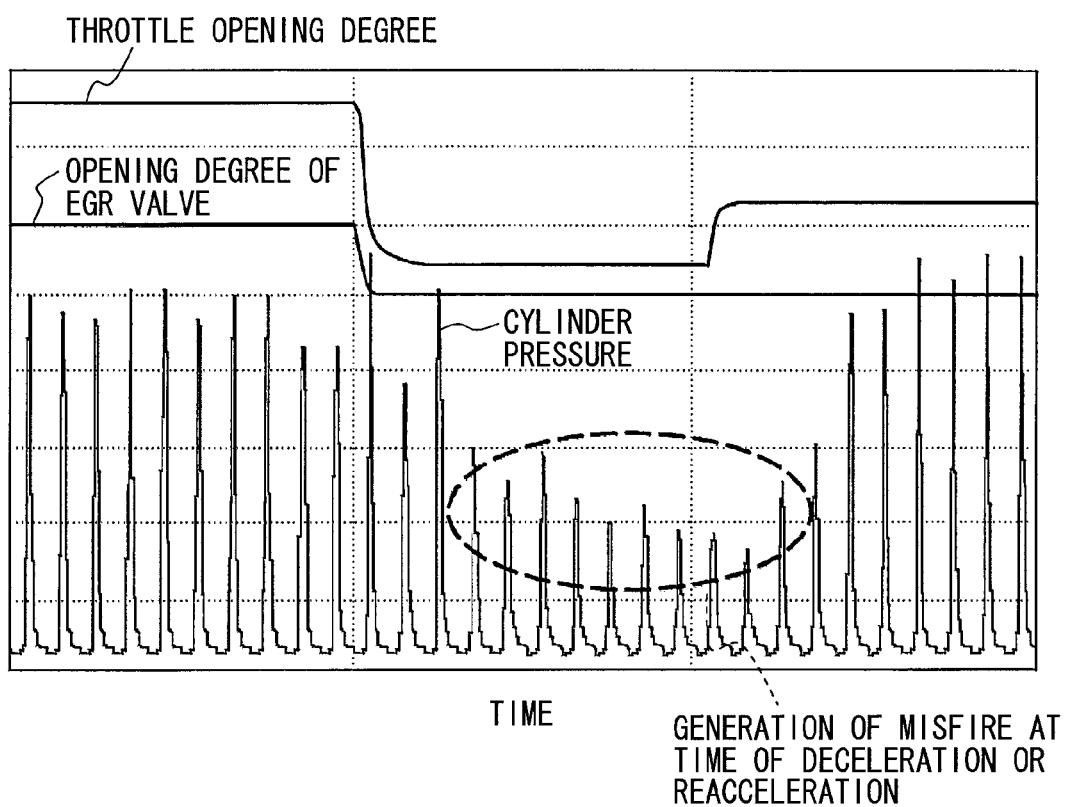
FIG. 2 is a diagram showing a time chart for describing occurrence of misfire caused by EGR gas at the time of decelerating the engine or the time of reaccelerating the engine.

However, as shown in FIG. 2, in the engine 11, which is provided with the EGR device 28, even when the EGR valve 31 is closed at the time of controlling the opening degree of the throttle valve 21 to the closing side thereof during deceleration of the engine 11 (deceleration of the vehicle), the EGR gas remains in the portion of the EGR conduit 29, which is located on the downstream side of the EGR valve 31, as well as in the intake conduit 12. Particularly, in the system, which recirculates the EGR gas to the portion of the intake passage located on the upstream side of the throttle valve 21, a large quantity of the EGR gas may remain in the portion of the intake passage located on the upstream side of the throttle valve 21. Therefore, the quantity of the EGR gas, which flows into the cylinder at the time of deceleration of the engine 11 or at the time of reacceleration of the engine 11 after the deceleration, may become excessively large to cause deterioration of the combustion state of the engine 11, possibly resulting in misfire.

Figure 3:
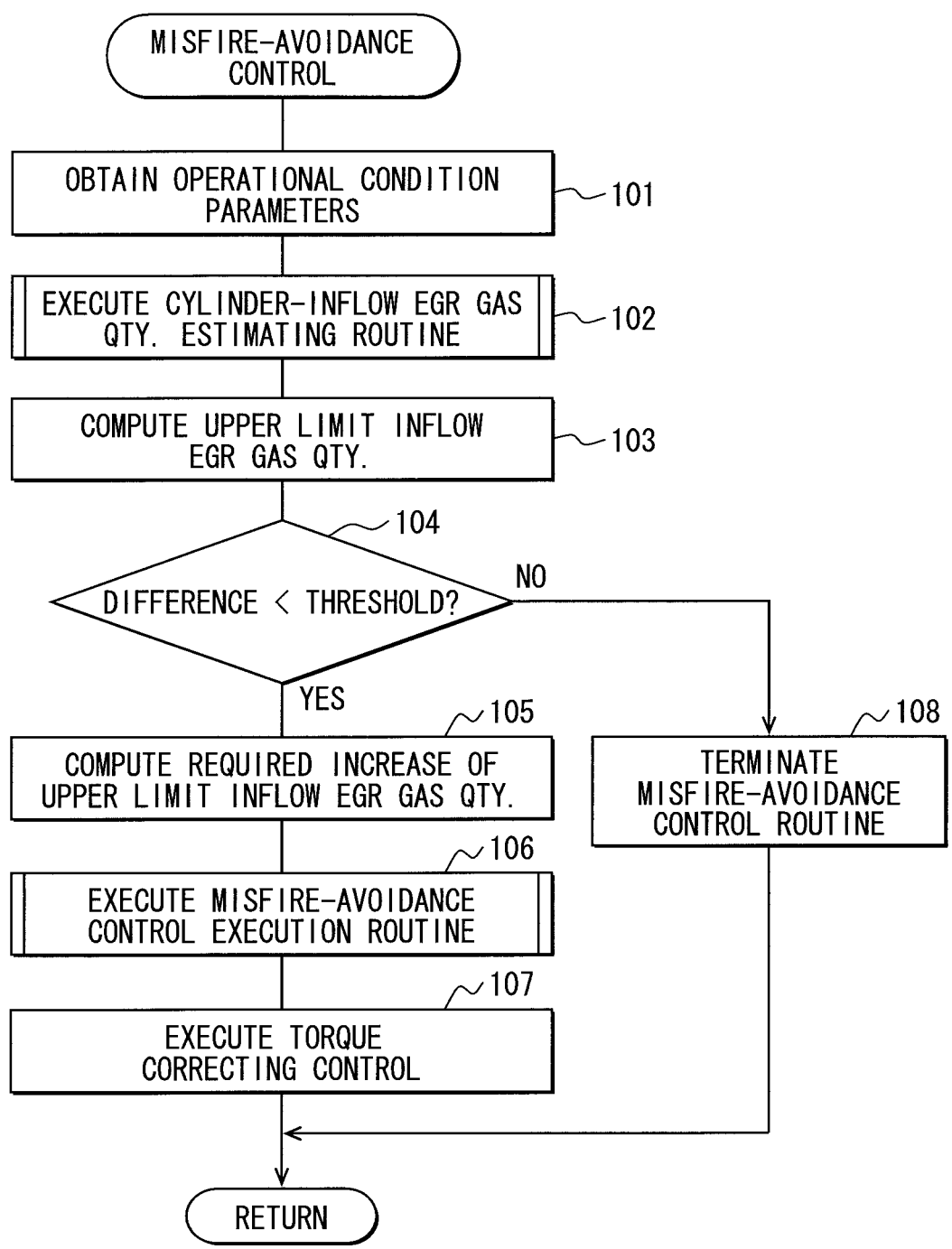
FIG. 3 is a flowchart showing a flow of a misfire-avoidance control routine according to the embodiment.
Figure 4:
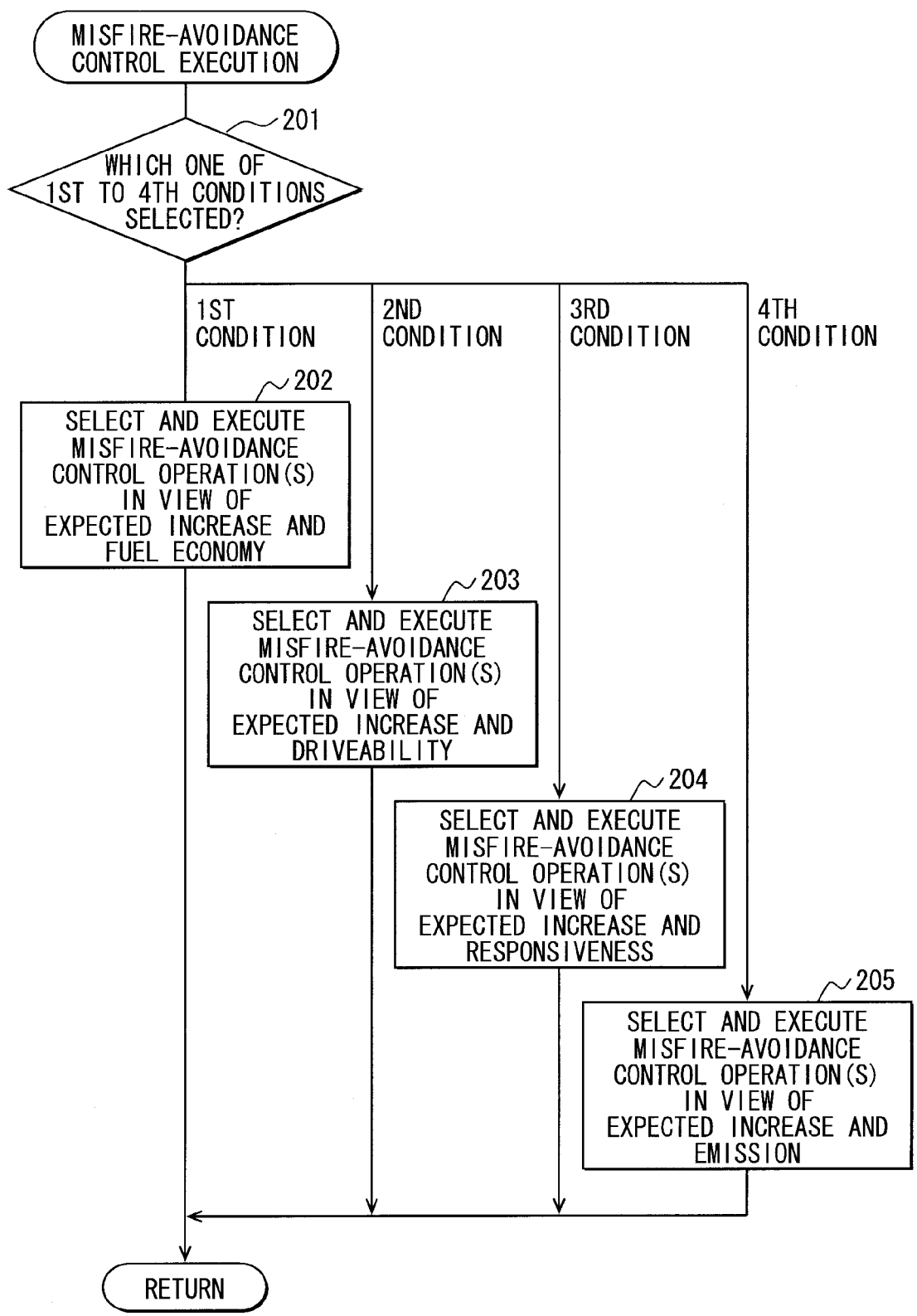
FIG. 4 is a flowchart showing a flow of a misfire-avoidance control execution routine according to the embodiment.

According to the present embodiment, the ECU 36 executes routines for avoiding the misfire shown in FIGS. 3 and 4 as a countermeasure against the misfire. The ECU 36 estimates a quantity of the EGR gas supplied into the cylinder (also referred to as a cylinder-inflow EGR gas quantity) by using an estimating method (see FIGS. 6 to 9) described later. Furthermore, the ECU 36 computes an upper limit quantity of the cylinder-inflow EGR gas (hereinafter referred to as an upper limit inflow EGR gas quantity) based on the engine operational state. The upper limit inflow EGR gas quantity is an upper limit of the allowable cylinder-inflow EGR gas quantity, equal to or below which normal combustion (combustion without misfire) is possible. The ECU 36 compares the cylinder-inflow EGR gas quantity (the estimated value of the cylinder-inflow EGR gas quantity) and the upper limit inflow EGR gas quantity and predicts whether misfire will occur based on this comparison. When it is predicted that the misfire will occur, the ECU 36 executes a misfire-avoidance control operation(s) to avoid the misfire. At that time, the ECU 36 computes a required increase of the upper limit inflow EGR gas quantity based on a difference between the cylinder-inflow EGR gas quantity and the upper limit inflow EGR gas quantity (the currently set upper limit inflow EGR gas quantity). The required increase of the upper limit inflow EGR gas quantity is an increase in the upper limit inflow EGR gas quantity, which needs to be achieved to limit or avoid occurrence of the misfire. The selected misfire-avoidance control operation(s) is executed under a condition, which corresponds to the required increase of the upper limit inflow EGR gas quantity.

Here, it should be noted that in place of the cylinder-inflow EGR gas quantity and the corresponding upper limit inflow EGR gas quantity discussed above, a cylinder-inflow EGR rate and an upper limit EGR rate indicated below may be used.

Cylinder-Inflow EGR Rate=(Cylinder-inflow EGR Gas Quantity/Total Cylinder-inflow Gas Quantity)

Upper Limit EGR Rate=(Upper limit inflow EGR gas quantity/Total Cylinder-inflow Gas Quantity)

Here, it should be noted that the total cylinder-inflow gas quantity is a sum of the cylinder-inflow fresh air quantity and the cylinder-inflow EGR gas quantity.

Now, the routines of FIGS. 3 and 4, which are executed by the ECU 36 in the present embodiment, will be described.

The misfire-avoidance control routine, i.e., the misfire-avoidance control process of FIG. 3 is executed at a predetermined cycle during an ON period of the electric power source of the ECU 36 (a period of turning on of an ignition switch) and serves as a misfire-avoidance control means. When the present routine is started, the operation proceeds to step 101. At step 101, engine operational condition parameters (e.g., the engine rotational speed and the intake air quantity) are obtained.

Thereafter, the operation proceeds to step 102. At step 102, a cylinder-inflow EGR gas quantity estimating routine (not shown) is executed by a cylinder-inflow EGR gas quantity determining arrangement 36a of the ECU 36 to estimate the cylinder-inflow EGR gas quantity through the estimating method described later (see FIGS. 6 to 9). This process at step 102 may serve as a cylinder-inflow EGR gas quantity determining means.

Thereafter, the operation proceeds to step 103. At step 103, the upper limit inflow EGR gas quantity (the upper limit of the cylinder-inflow EGR gas quantity of the EGR gas, which is normally combustible without causing misfire in the cylinder) is computed by an upper limit inflow EGR gas quantity computing arrangement 36d of the ECU 36 by using a map or a mathematical equation based on the engine operational state (e.g., the intake air flow quantity). The map or the equation for determining the upper limit inflow EGR gas quantity is prepared in advance based on experimental data or design data and is stored in the ROM of the ECU 36. This process at step 103 may serve as an upper limit inflow EGR gas quantity computing means.

Thereafter, the operation proceeds to step 104. At step 104, the cylinder-inflow EGR gas quantity is compared with the currently set upper limit inflow EGR gas quantity, and it is determined whether the misfire will occur based this comparison. Specifically, a misfire predicting arrangement 36b of the ECU 36 predicts, i.e., determines whether the misfire will occur by determining whether a value of difference between the currently set upper limit inflow EGR gas quantity and the cylinder-inflow EGR gas quantity is smaller than a predetermined threshold value. When the cylinder-inflow EGR gas quantity exceeds the currently set upper limit inflow EGR gas quantity, the misfire occurs. Therefore, it is possible to accurately predict whether the misfire will occur by determining whether the value of difference between the currently set upper limit inflow EGR gas quantity and the cylinder-inflow EGR gas quantity is smaller than the threshold value. This process at step 104 may serve as a misfire occurrence predicting means.

In a case where it is determined that the misfire will occur at step 104 (a case where the value of difference between the currently set upper limit inflow EGR gas quantity and the cylinder-inflow EGR gas quantity is smaller than the threshold value), the operation proceeds to step 105. At step 105, the required increase of the upper limit inflow EGR gas quantity is computed by using a map or a mathematical equation based on the difference between the cylinder-inflow EGR gas quantity and the currently set upper limit inflow EGR gas quantity (i.e., an excess of the cylinder-inflow EGR gas quantity relative to the currently set upper limit inflow EGR gas quantity, thereby serving as information that indicates a combustion deterioration degree). The map or the equation for determining the required increase of the upper limit inflow EGR gas quantity is prepared in advance based on experimental data or design data and is stored in the ROM of the ECU 36.

Alternatively, a value, which is obtained by dividing the difference between the cylinder-inflow EGR gas quantity and the upper limit inflow EGR gas quantity (the excess of the cylinder-inflow EGR gas quantity relative to the upper limit inflow EGR gas quantity) by the total cylinder-inflow gas quantity, may be used as the required increase of the upper limit inflow EGR gas quantity. Further alternatively, in the case where the cylinder-inflow EGR rate and the upper limit EGR rate are used in place of the cylinder-inflow EGR gas quantity and the upper limit inflow EGR gas quantity, the difference between the cylinder-inflow EGR rate and the upper limit EGR rate (the excess of the cylinder-inflow EGR rate relative to the limit EGR rate) may be computed as the required increase of the upper limit inflow EGR gas quantity.

Thereafter, the operation proceeds to step 106. At step 106, the misfire-avoidance control execution routine of FIG. 4 is executed by a misfire-avoidance control arrangement 36c of the ECU 36 as follows to execute the selected misfire-avoidance control operation(s) under the condition, which corresponds to the required increase of the upper limit inflow EGR gas quantity that needs to be achieved to avoid the misfire.

First of all, at step 201, a first priority condition is selected for the present time (present cycle of the routine) from first to fourth conditions (1) to (4) listed below based on the current operational state (e.g., the engine rotational speed, the engine load, the vehicle speed, the accelerator opening degree and/or a shift position of a shift lever of a transmission) and/or a currently selected drive mode (e.g., an economy mode, a sports mode).

(1) Fuel-economy-oriented Condition
(2) Driveability-oriented Condition
(3) Responsiveness-oriented Condition
(4) Emission-oriented Condition When the first priority condition is selected for the present time (the present cycle of the routine) from the first to fourth conditions (1) to (4) discussed above at step 201, the operation proceeds to a corresponding one of steps 202 to 205 based on the result of the selection made at step 201 (i.e., the selected one of the first to fourth conditions (1) to (4) discussed above) to select and execute the corresponding misfire-avoidance control operation(s), which satisfies the required increase of the upper limit inflow EGR gas quantity and the first priority condition, among a plurality of misfire-avoidance control operations by using a misfire-avoidance control operation selection map shown in FIG. 5. In the misfire-avoidance control operation selection map of FIG. 5, an expected increase of the upper limit inflow EGR gas quantity, a fuel economy deterioration degree, a drivability deterioration degree, a responsiveness deterioration degree (more specifically, an engine responsiveness deterioration degree) and an emission deterioration degree (more specifically, an engine emission deterioration degree) are set for each of the misfire-avoidance control operations (a) to (d). Furthermore, in FIG. 5, the expected increase of the upper limit EGR gas quantity is indicated by a concentration (%) of the inflow EGR gas as an example of the inflow EGR gas quantity. However, the EGR gas quantity may be alternatively expressed by its weight or volume. The misfire-avoidance control operation selection map is prepared in advance based on test data and design data and is prestored in the ROM of the ECU 36.

When the first condition, i.e., the fuel-economy-oriented condition is selected as the first priority condition of the present time at step 201, the operation proceeds to step 202. At step 202, in view of the expected increase of the upper limit inflow EGR gas quantity and the fuel economy deterioration degree of the respective misfire-avoidance control operations shown in FIG. 5, a combination (also referred to as a set) of the misfire-avoidance control operation(s) (at least one of the misfire-avoidance control operations) is selected such that a sum of the expected increase(s) of the upper limit inflow EGR gas quantity of the combination becomes equal to or larger than the required increase of the upper limit inflow EGR gas quantity, and a sum of the fuel economy deterioration degree(s) of the combination becomes minimum. Then, the selected combination (selected set) of the misfire-avoidance control operation(s) is executed.

When the second condition, i.e., the driveability-oriented condition is selected as the first priority condition of the present time at step 201, the operation proceeds to step 203. At step 203, in view of the expected increase of the upper limit inflow EGR gas quantity and the driveability deterioration degree of the respective misfire-avoidance control operations shown in FIG. 5, a combination of the misfire-avoidance control operation(s) (at least one of the misfire-avoidance control operations) is selected such that a sum of the expected increase(s) of the upper limit inflow EGR gas quantity of the combination becomes equal to or larger than the required increase of the upper limit inflow EGR gas quantity, and a sum of the driveability deterioration degree(s) of the combination becomes minimum. Then, the selected combination (selected set) of the misfire-avoidance control operation(s) is executed.

When the third condition, i.e., the responsiveness-oriented condition (i.e., the engine responsiveness oriented condition) is selected as the first priority condition of the present time at step 201, the operation proceeds to step 204. At step 204, in view of the expected increase of the upper limit inflow EGR gas quantity and the responsiveness deterioration degree of the respective misfire-avoidance control operations shown in FIG. 5, a combination of the misfire-avoidance control operation(s) (at least one of the misfire-avoidance control operations) is selected such that a sum of the expected increase(s) of the upper limit inflow EGR gas quantity of the combination becomes equal to or larger than the required increase of the upper limit inflow EGR gas quantity, and a sum of the responsiveness deterioration degree(s) of the combination becomes minimum. Then, the selected combination (selected set) of the misfire-avoidance control operation(s) is executed.

When the fourth condition, i.e., the emission-oriented condition is selected as the first priority condition of the present time at step 201, the operation proceeds to step 205. At step 205 in view of the expected increase of the upper limit inflow EGR gas quantity and the emission deterioration degree of the respective misfire-avoidance control operations shown in FIG. 5, a combination of the misfire-avoidance control operation(s) (at least one of the misfire-avoidance control operations) is selected such that a sum of the expected increase(s) of the upper limit inflow EGR gas quantity of the combination becomes equal to or larger than the required increase of the upper limit inflow EGR gas quantity, and a sum of the emission deterioration degree(s) of the combination becomes minimum. Then, the selected combination (selected set) of the misfire-avoidance control operation(s) is executed.

The selectable misfire-avoidance control operations discussed above may include the following control operations.

(I) Fuel Injection Quantity Increasing Control Operation

The fuel injection quantity increasing control operation is a control operation that increases the fuel injection quantity of the fuel injection valve.

(II) First Ignition Energy Increasing Control Operation

The first ignition energy increasing control operation is a control operation that increases the ignition energy of the spark plug by lengthening a spark discharge time period of the spark plug.

(III) Second Ignition Energy Increasing Control Operation

The second ignition energy increasing control operation is a control operation that increases the ignition energy of the spark plug by increasing an electric current for energizing the spark plug.

(IV) Third Ignition Energy Increasing Control Operation

The third ignition energy increasing control operation is a control operation that increases the ignition energy of the spark plug by increasing the number of ignitions of the spark plug.

(V) First Gas Flow Strengthening Control Operation

The first gas flow strengthening control operation is a control operation that strengthens a tumble flow in the cylinder through a tumble control valve.

(VI) Second Gas Flow Strengthening Control Operation

The second gas flow strengthening control operation is a control operation that strengthens a swirl flow in the cylinder through a swirl control valve.

(VII) Third Gas Flow Strengthening Control Operation

The third gas flow strengthening control operation is a control operation that strengthens a gas flow by increasing a flow velocity of the intake air, which flows into the cylinder, through a reduction in the lift amount of the intake valve that reduces an open cross-sectional area of the intake passage, which supplies the intake air into the cylinder.

(VIII) Fourth Gas Flow Strengthening Control Operation

The fourth gas flow strengthening control operation is a control operation that strengthens a gas flow by injecting fresh air into the cylinder through a fresh air injection valve that is adapted to inject the fresh air into the cylinder.

(IX) Intake Air Quantity Increasing Control Operation

The intake air quantity increasing control operation is a control operation that increases the intake air quantity by increasing the throttle opening degree.

When the fuel injection quantity is increased by the fuel injection quantity increasing control operation, the ignitability and the combustion speed of the mixture gas (air-fuel mixture) can be increased to improve the combustion state, and thereby it is possible to limit the occurrence of the misfire. Furthermore, when the ignition energy is increased through the ignition energy increasing control operation, the ignitability of the mixture gas is increased to improve the combustion state, and thereby it is possible to limit the occurrence of the misfire. Furthermore, when the gas flow is strengthened through the gas flow strengthening control operation, the combustion speed of the mixture gas is increased to improve the combustion state, and thereby it is possible to limit the occurrence of the misfire. Furthermore, when the intake air quantity is increased through the intake air quantity increasing control operation, the cylinder-inflow air quantity is increased to improve the EGR tolerance, and thereby it is possible to limit the occurrence of the misfire.

In the routine of FIG. 4, the combination of the misfire-avoidance control operation(s) is changed according to the required increase of the upper limit inflow EGR gas quantity. However, the present disclosure is not limited to this. For instance, a control quantity (controlled quantity, i.e., controlled amount) of the misfire-avoidance control operation(s) (e.g., an increased fuel injection quantity, an increased ignition energy amount, an increased gas flow strengthening amount, an increased intake air quantity) or the execution timing of the misfire-avoidance control operation(s) may be changed according to the required increase of the upper limit inflow EGR gas quantity.

Thereafter, the operation proceeds to step 107 of FIG. 3. At step 107, in the case where the intake air quantity increasing control operation is executed (in the case where the intake air quantity increasing control operation is selected as the misfire-avoidance control operation), a torque correcting control operation(s), which limits a torque change (torque increase) of the engine 11 caused by the intake air quantity increasing control operation, is executed. In this way, a torque increase of the engine 11, which is caused by the intake air quantity increasing control operation, can be absorbed, i.e., counteracted by a torque decrease, which is caused by the torque correcting control operation(s), to limit or minimize the torque change caused by the intake air quantity increasing control operation, and thereby it is possible to limit the deterioration of the driveability.

The executable torque correcting control operations discussed above may include the following control operations.

(I) Control operation, which reduces the torque of the engine 11 by stopping an operation of at least one of the cylinders.

(II) Control operation, which reduces the torque of the engine 11 by retarding the ignition timing from the most appropriate ignition timing, i.e., the minimum advance for the best torque (MBT) timing.

(III) Control operation, which reduces the torque of the engine 11 by generating a brake force through an antilock brake system (ABS).

(IV) Control operation, which reduces the torque of the engine 11 by driving an auxiliary device (e.g., a compressor of an air conditioning system, an electric fan).

Thereafter, when it is determined that the value of difference between the upper limit inflow EGR gas quantity and the cylinder-inflow EGR gas quantity is equal to or larger than the threshold value at step 104, the operation proceeds to step 108. At step 108, the misfire-avoidance control routine, i.e., the misfire-avoidance control process is terminated (in a case where a torque correcting control routine for executing at least one of the above-discussed torque correcting control operations is executed, the torque correcting control routine, i.e., the torque correcting control process is also terminated).

Next, the estimating method for estimating the cylinder-inflow EGR gas quantity executed by the cylinder-inflow EGR gas quantity determining arrangement 36a of the ECU 36 will be described in detail with reference to FIGS. 3 to 6.

As in the present embodiment, in the system that has the LPL EGR device 28, which recirculates the EGR gas to the portion of the intake conduit 12 located on the upstream side of the compressor 19 (the intake passage on the upstream side of the throttle valve 21), the ECU 36 computes (estimates) the cylinder-inflow EGR gas quantity as follows.

Figure 6:
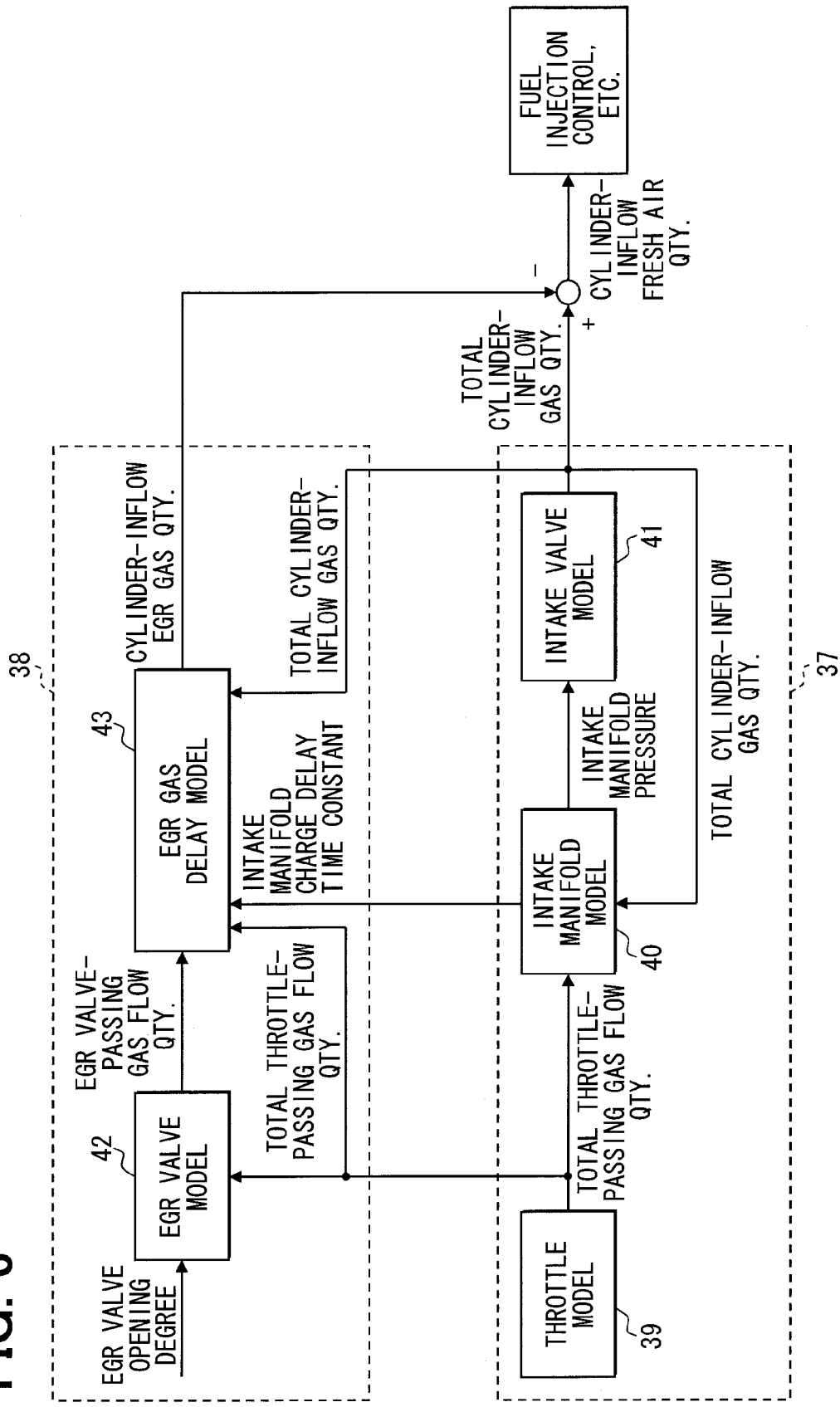
FIG. 6 is a block diagram for describing a computation method for computing a cylinder-inflow EGR gas quantity according to the embodiment.

As shown in FIG. 6, a total cylinder-inflow gas quantity computing portion 37 of the cylinder-inflow EGR gas quantity determining arrangement 36a of the ECU 36 computes a total throttle-passing gas flow quantity (a total quantity of gas that passes through the throttle valve 21) by using a throttle model 39. The throttle model 39 is a model that simulates the behavior of the gas in the intake conduit 12 at the time of passing through the throttle valve 21. For instance, a throttle model, which is recited in JP2008-101626A, may be used as the throttle model 39.

Here, it should be noted that the computed value of the total throttle-passing gas flow quantity (the total throttle-passing gas flow quantity computed by using the throttle model 39) may be corrected by using a fresh air flow quantity (a flow quantity of the fresh air that flows through the intake conduit 12), which is sensed with the air flow meter 14. Specifically, in a state where a predetermined correction value learning condition is satisfied (e.g., in a steady operational state), a difference between the fresh air flow quantity, which is sensed with the air flow meter 14, and the computed value of the total throttle-passing gas flow quantity, is computed as a gas flow quantity correction value, and this gas flow quantity correction value is stored in the memory of the ECU 36. Then, the computed value of the total throttle-passing gas flow quantity is corrected by using the gas flow quantity correction value. In this way, the total throttle-passing gas flow quantity can be accurately obtained.

Further alternatively, in a case of a system, which does not have the air flow meter 14, the fresh air flow quantity may be estimated (computed) based on an intake conduit pressure, which is sensed with an intake conduit pressure sensor (not shown). Then, the computed value of the total throttle-passing gas flow quantity may be corrected by using the estimated fresh air quantity. Specifically, in the state where the predetermined correction value learning condition is satisfied (e.g., in the steady operational state), the fresh air flow quantity is estimated (computed) based on the intake conduit pressure, which is sensed with the intake conduit pressure sensor, by using a map or a mathematical equation. Furthermore, the correction value of the fresh air flow quantity is computed based on an air-fuel ratio feedback correction quantity by using a map or a mathematical equation, and the estimated fresh air flow quantity, which is estimated based on the intake conduit pressure, is corrected by using the correction value. Thereafter, a difference between the estimated fresh air flow quantity (the fresh air flow quantity after the correction), which is estimated based on the intake conduit pressure, and the computed value of the total throttle-passing gas flow quantity is computed as a gas flow quantity correction value, and this gas flow quantity correction value is stored in the memory of the ECU 36. Then, the computed value of the total throttle-passing gas flow quantity is corrected by using the gas flow quantity correction value. In this way, even in the case of the system, which does not have the air flow meter 14, the total throttle-passing gas flow quantity can be accurately obtained.

Thereafter, an intake manifold pressure (a pressure in the intake passage on the downstream side of the throttle valve 21) is computed based on the total throttle-passing gas flow quantity and a previous value of the total cylinder-inflow gas quantity by using an intake manifold model 40. The intake manifold model 40 is a model that simulates the behavior of the gas at the time of being charged into a portion (e.g., the surge tank 23 and the intake manifold 24) of the intake passage located on the downstream side of the throttle valve 21 after passing through the throttle valve 21. For instance, an intake conduit model, which is recited in JP2008-101626A, may be used as the intake manifold model 40.

Thereafter, the total cylinder-inflow gas quantity (=cylinder-inflow fresh air quantity+cylinder-inflow EGR gas quantity) is computed based on the intake manifold pressure by using an intake valve model 41. The intake valve model 41 is a model that simulates the behavior of the gas at the time of being drawn into the cylinder after being charged into the portion of the intake passage located on the downstream side of the throttle valve 21. An intake valve model, which is recited in JP2008-101626A, may be used as the intake valve model 41.

A cylinder-inflow EGR gas flow quantity computing portion 38 of the cylinder-inflow EGR gas quantity determining arrangement 36a of the ECU 36 computes an EGR valve-passing gas flow quantity (a flow quantity of the EGR gas, which passes through the EGR valve 31) by using an EGR valve model 42. The EGR valve model 42 is a model that simulates the behavior of the EGR gas at the time of passing through the EGR valve 31 in the EGR conduit 29.

Figure 7:
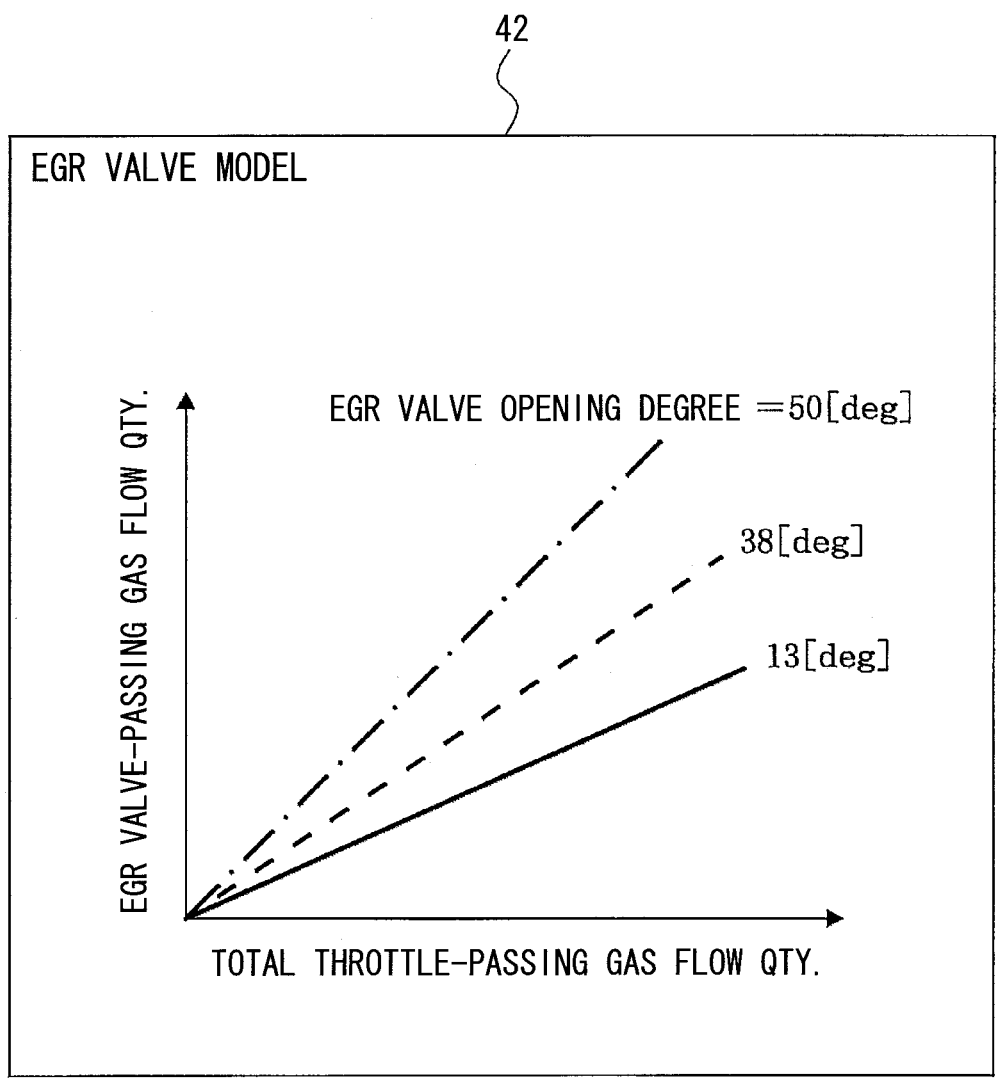
FIG. 7 is a diagram for describing an EGR valve model according to the embodiment.

As shown in FIG. 7, the EGR valve model 42 is constructed as a map that defines a relationship among the opening degree of the EGR valve 31, the total throttle-passing gas flow quantity and the EGR valve-passing gas flow quantity. The EGR valve-passing gas flow quantity is computed based on the opening degree of the EGR valve 31 and the total throttle-passing gas flow quantity by using the map of the EGR valve-passing gas flow quantity. The map of the EGR valve-passing gas flow quantity is prepared in advance based on test data and design data and is prestored in the ROM of the ECU 36.

Alternatively, the EGR valve model 42 may be constructed as a mathematical or physics equation, which defines a relationship among the opening degree of the EGR valve 31, a pressure Pin on the upstream side of the EGR valve 31, a pressure Pout on the downstream side of the EGR valve 31 and the EGR valve-passing gas flow quantity Megr.

Specifically, the EGR valve model 42 may be approximated by using the following equation of a throttle (equation of an orifice).

$$Megr = C \cdot A \cdot \frac{Pin}{\sqrt{R \cdot Tegr}} \cdot \Phi(Pout/Pin)$$

In the above equation, C denotes a discharge coefficient, and A denotes an opening cross-sectional area of the EGR conduit 29, which changes in response to the opening degree of the EGR valve 31. Furthermore, R denotes a gas constant, and Tegr denotes a temperature of the EGR gas on the upstream side of the EGR valve 31. Furthermore, $\Phi(Pout/Pin)$ is a function that uses (Pout/Pin) as a variable.

In this case, the EGR valve-passing gas flow quantity Megr is computed based on the opening degree of the EGR valve 31, the pressure Pin on the upstream side of the EGR valve 31, the pressure Pout on the downstream side of the EGR valve 31, and the temperature of the EGR gas by using the equation of the throttle (the equation of the orifice) discussed above.

Thereafter, the cylinder-inflow EGR gas quantity is computed based on the computed value of the EGR valve-passing gas flow quantity by using an EGR gas delay model 43 (see FIG. 6). The EGR gas delay model 43 is a model that simulates the behavior of the EGR gas until the time of flowing into the cylinder by passing through the throttle valve 21 after passing through the EGR valve 31.

Figure 8:
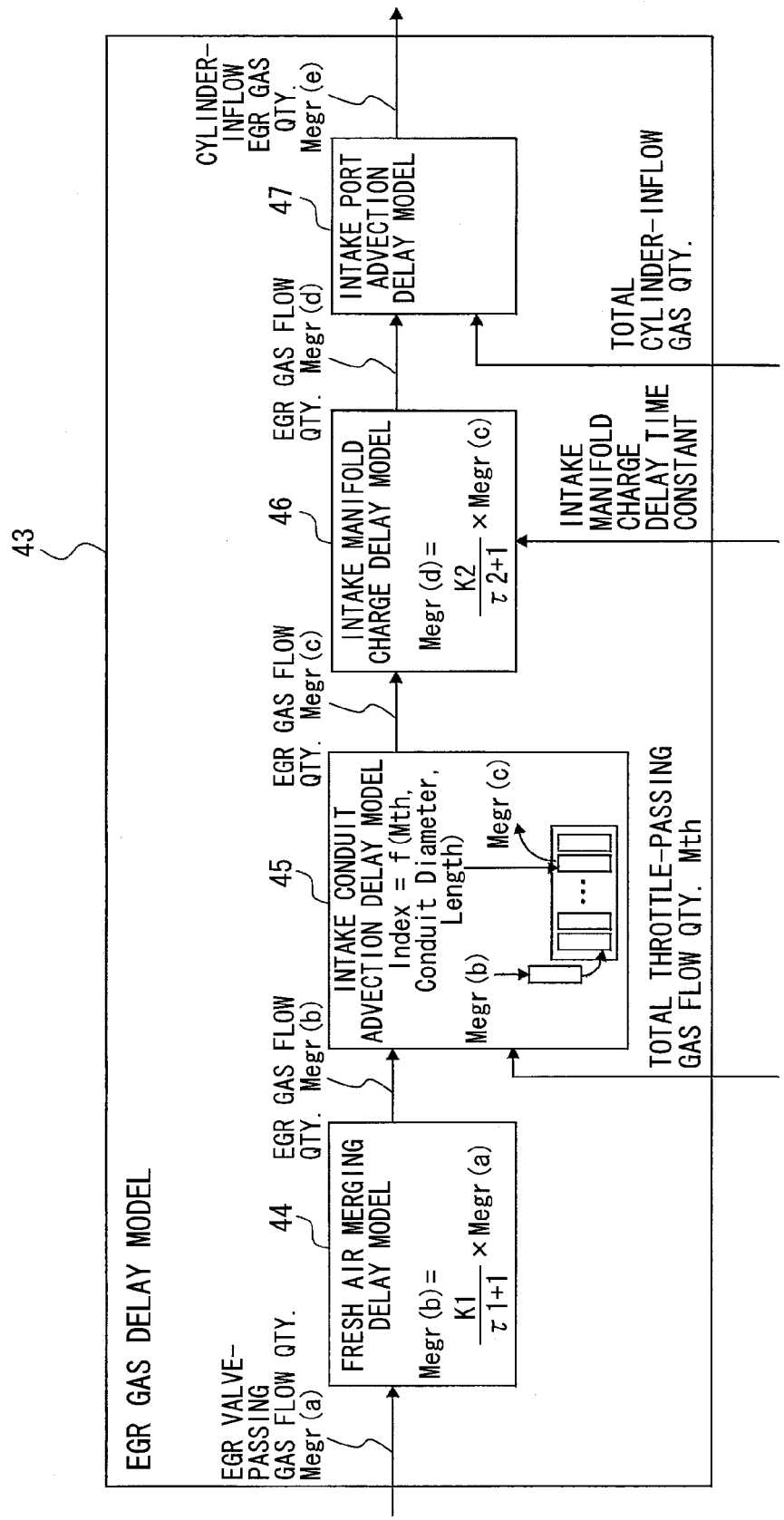
FIG. 8 is a block diagram for describing an EGR gas delay model according to the embodiment.

As shown in FIG. 8, the EGR gas delay model 43 includes a fresh air merging delay model 44, an intake conduit advection delay model 45, an intake manifold charge delay model 46 and an intake port advection delay model 47. The fresh air merging delay model 44 is a model that simulates the behavior of the EGR gas at the time of flowing into a portion (a portion of the intake conduit 12 located on the upstream side of the compressor 19) of the intake passage located on the upstream side of the throttle valve 21 after passing through the EGR valve 31. The intake conduit advection delay model 45 is a model that simulates the behavior of the EGR gas until the time of passing through the throttle valve 21 after flowing into the portion of the intake passage located on the upstream side of the throttle valve 21. The intake manifold charge delay model 46 is a model that simulates the behavior of the EGR gas at the time of being charged into a portion (e.g., the surge tank 23 and the intake manifold 24) of the intake passage located on the downstream side of the throttle valve 21 after passing through the throttle valve 21. The intake port advection delay model 47 is a model that simulates the behavior of the EGR gas until the time of flowing into the cylinder through the intake port after being charged into the portion of the intake passage located on the downstream side of the throttle valve 21.

Thereby, the delay of the EGR gas that occurs at the time of flowing into the portion of the intake passage located on the upstream side of the throttle valve 21, the convection delay of the EGR gas that occurs until the time of passing through the throttle valve 21 after flowing into the portion of the intake passage located on the upstream side of the throttle valve 21, the charge delay of the EGR gas that occurs at the time of being charged into the portion of the intake passage located on the downstream side of the throttle valve 21 after passing through the throttle valve 21, and the convection delay of the EGR gas that occurs until the time of flowing into the cylinder through the intake port after being charged into the portion of the intake passage located on the downstream side of the throttle valve 21 can be reflected into the computation of the cylinder-inflow EGR gas quantity. Thus, the estimation accuracy of the cylinder-inflow EGR gas quantity can be improved.

At the time of computing the cylinder-inflow EGR gas quantity, an EGR gas flow quantity Megr(b), which is a flow quantity of the EGR gas that flows into the portion of the intake passage located on the upstream side of the throttle valve 21, is computed based on an EGR valve-passing gas flow quantity Megr(a) by using the fresh air merging delay model 44.

The fresh air merging delay model is approximated by using the following equation (1).

$$Megr(b)=[K1/(\tau 1+1)] \times Megr(a) \qquad \text{Equation (1)}$$

A coefficient K1 and the time constant τ1 of the above equation (1) are values that are determined based on a conduit diameter and a conduit length of the portion of the EGR conduit 29 (the portion of the EGR conduit 29 from the EGR valve 31 to a merging portion, at which the EGR conduit 29 is connected to the intake conduit 12) and the conduit diameter of the intake conduit 12. The coefficient K1 and the time constant τ1 are computed in advance based on the test data and the design data.

Thereafter, an EGR gas flow quantity Megr(c), which is a flow quantity of the EGR gas that passes through the throttle valve 21, is computed based on the EGR gas flow quantity Megr(b), which is the flow quantity of the EGR gas that flows into the portion of the intake passage located on the upstream side of the throttle valve 21, and the total throttle-passing gas flow quantity Mth by using the intake conduit advection delay model 45.

Figure 9:
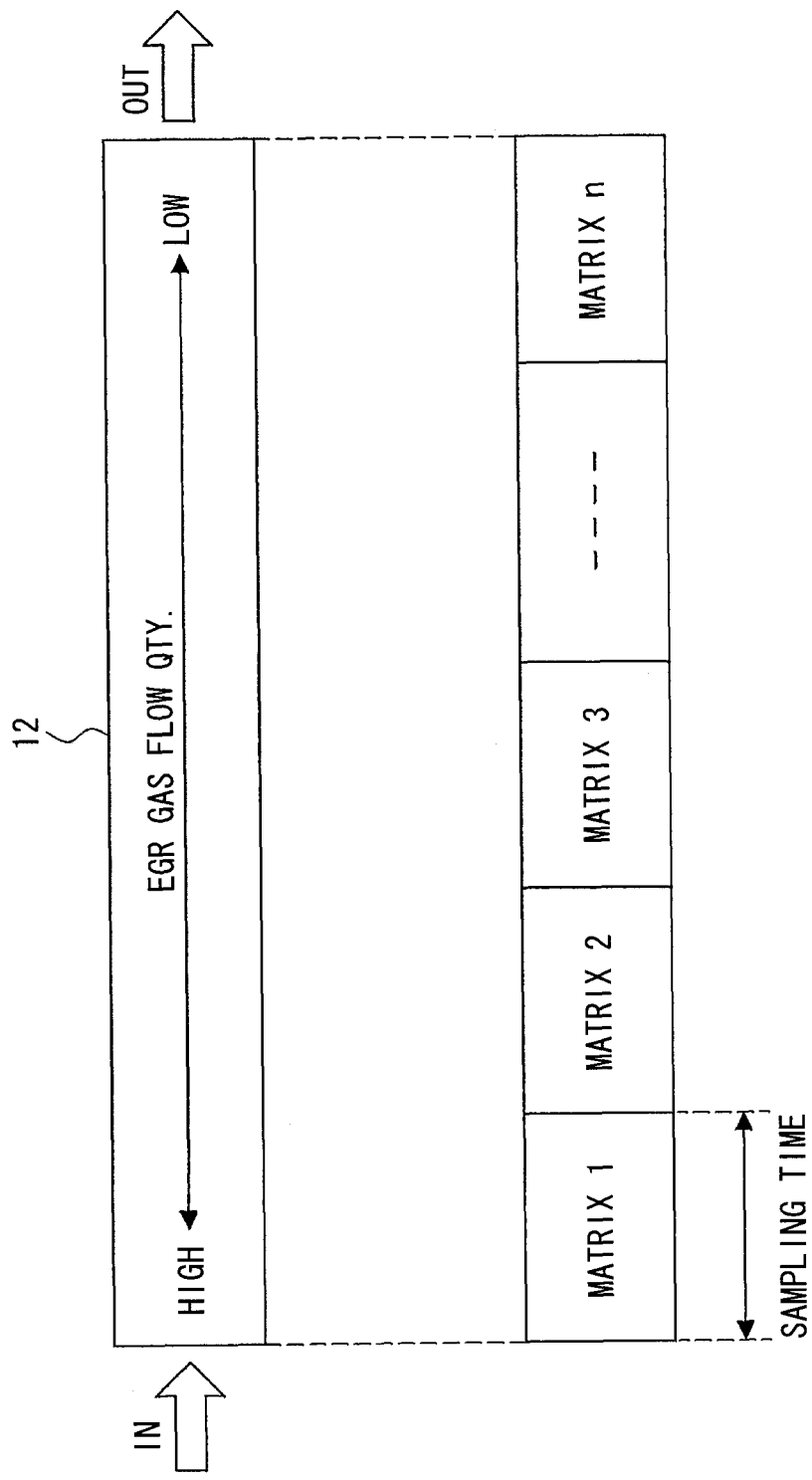
FIG. 9 is a diagram for describing an intake conduit advection delay model according to the embodiment.

With reference to FIG. 9, the intake conduit advection delay model 45 is constructed as follows. Specifically, the behavior of the EGR gas of the continuous time system, which is measured until the time of passing through the throttle valve 21 after flowing into the portion of the intake passage located on the upstream side of the throttle valve 21, is transformed into a plurality of matrices, which are formed at predetermined time intervals through the discretization (e.g., 32 matrices, which are formed one after another at 16 millisecond sampling time intervals through the discretization). These matrices construct the intake conduit advection delay model 45 and form a queue, i.e., the first in first out (FIFO) data structure in the memory (rewritable memory or storage) of the ECU 36. Each matrix indicates the corresponding EGR gas flow quantity. In general, a moving speed of the EGR gas in the intake conduit 12 is sufficiently slow in comparison to the computation speed of the ECU 36, so that the intake conduit advection delay model 45 can be constructed by the matrices, which are formed one after another at the predetermined time intervals through the discretization. Various coefficients, which are used in the intake conduit advection delay model 45, are values that are determined based on a conduit diameter and a conduit length of a portion of the intake conduit 12 (the portion of the intake conduit 12 that is from the merging portion, at which the EGR conduit 29 is connected to the intake conduit 12, to the throttle valve 21) and are computed in advance based on the test data and the design data.

Thereafter, as shown in FIG. 8, the intake manifold charge delay model 46 is used to compute an EGR gas flow quantity Megr(d), which is a flow quantity of the EGR gas charged into the portion (e.g., the surge tank 23 and the intake manifold 24) of the intake passage located on the downstream side of the throttle valve 21, based on the EGR gas flow quantity Megr(c), which is the flow quantity of the EGR gas that passes through the throttle valve 21.

The intake manifold charge delay model 46 is approximated by using the following equation (2).

$$Megr(d)=[K2/(\tau 2+1)] \times Megr(c) \qquad \text{Equation (2)}$$

A coefficient K2 and an intake manifold charge delay time constant τ2 of the above equation (2) are values that are determined based on, for example, a conduit diameter, a length and a volume of the portion (the portion, such as the surge tank 23 and the intake manifold 24, of the intake conduit 12 located on the downstream side of the throttle valve 21) of the intake passage located on the downstream side of the throttle valve 21. The coefficient K2 and the intake manifold charge delay time constant τ2 of the above equation (2) are computed in advance based on the test data and the design data. In a case where the intake manifold charge delay time constant is used in the intake manifold model 40, the intake manifold charge delay time constant, which is used in the intake manifold model 40, may be used in the intake manifold charge delay model 46.

Thereafter, the intake port advection delay model 47 is used to compute a cylinder-inflow EGR gas quantity Megr(e) based on the EGR gas flow quantity Megr(d), which is the flow quantity of the EGR gas charged into the portion of the intake passage located on the downstream side of the throttle valve 21, and the previous value of the total cylinder-inflow gas quantity.

The intake port advection delay model 47 is constructed as follows. Specifically, the behavior of the EGR gas of the continuous time system, which is measured until the time of flowing into the cylinder through the intake port after being charged into the portion of the intake passage located on the downstream side of the throttle valve 21, is transformed into a plurality of matrices, which are formed one after another at predetermined time intervals through discretization. These matrices construct the intake port advection delay model 47 and form a queue, i.e., the first in first out (FIFO) data structure in the memory of the ECU 36. Various coefficients, which are used in the intake port advection delay model 47, are values that are determined based on the conduit diameter and the conduit length of the corresponding portion of the intake conduit 12 and are computed in advance based on the test data and the design data.

Figure 10A:
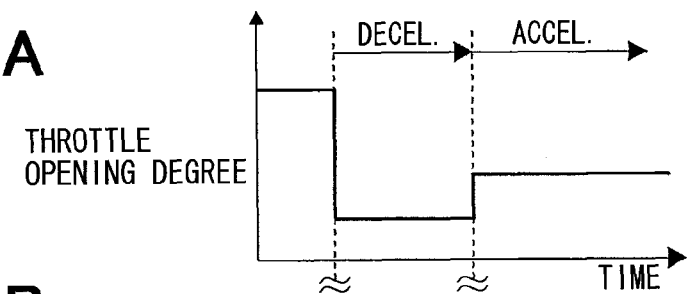
FIG. 10A is a diagram showing a change in a throttle opening degree with time.
Figure 10B:
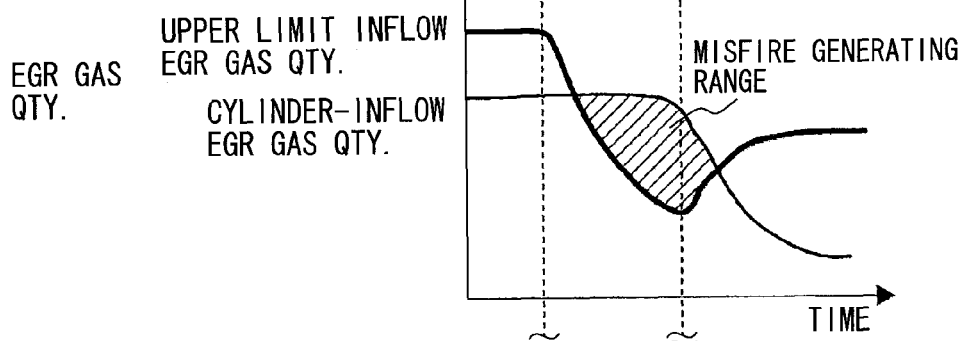
FIG. 10B is a diagram showing a change in the cylinder-inflow EGR gas quantity and a change in the upper limit inflow EGR gas quantity with time in a first comparative example.
Figure 10C:
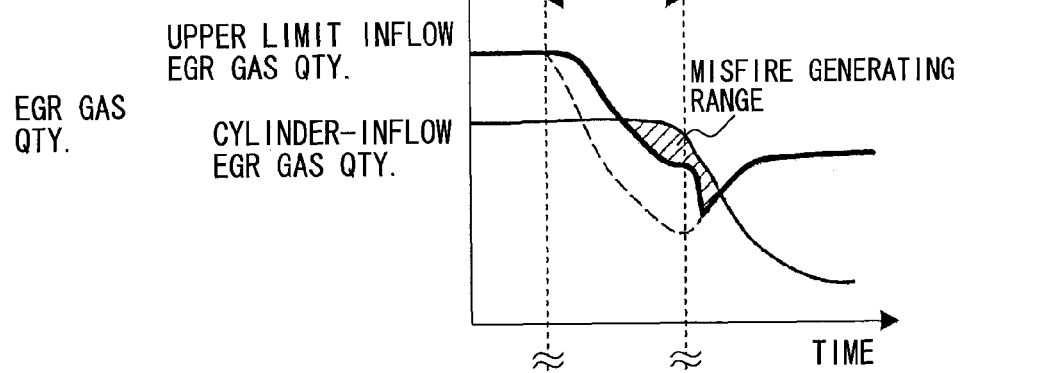
FIG. 10C is a diagram showing a change in the cylinder-inflow EGR gas quantity and a change in the upper limit inflow EGR gas quantity with time in a second comparative example.
Figure 10D:
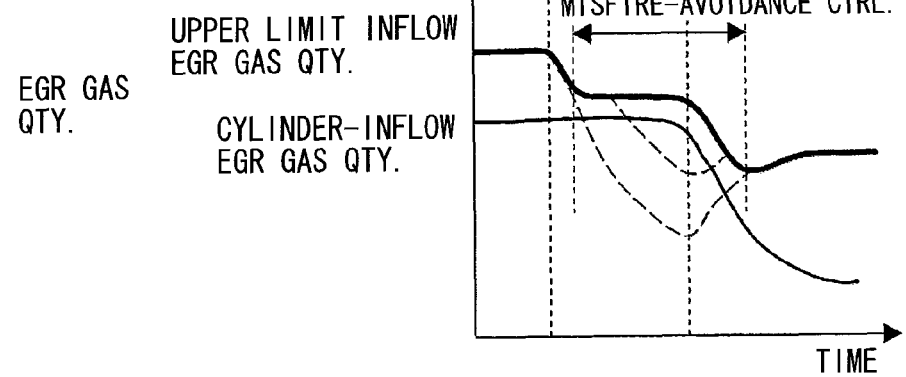
FIG. 10D is a diagram showing a change in the cylinder-inflow EGR gas quantity and a change in the upper limit inflow EGR gas quantity with time according to the embodiment of the present disclosure.

Now, an advantage of the present embodiment will be described in comparison to first and second comparative examples (previously proposed techniques) with reference to FIGS. 10A to 10D. FIG. 10A is a diagram showing a change in a throttle opening degree (an opening degree of the throttle valve 21) with time. More specifically, during the time of decelerating the engine (see a period of "DECEL." in FIG. 10A), the throttle opening degree is reduced. Thereafter, during the time of reaccelerating the engine (see a period of "ACCEL." in FIG. 10A), the throttle opening degree is increased. FIG. 10B shows a change in the cylinder-inflow EGR gas quantity and a change in the upper limit inflow EGR gas quantity with time in the first comparative example. FIG. 10C shows a change in the cylinder-inflow EGR gas quantity and a change in the upper limit inflow EGR gas quantity with time in the second comparative example. FIG. 10D shows a change in the cylinder-inflow EGR gas quantity and a change in the upper limit inflow EGR gas quantity with time in the present embodiment. In the system of the first comparative example shown in FIG. 10B, which does not execute any misfire-avoidance control operation, when the throttle opening degree is controlled to the closing side during the time of decelerating the engine (see the period of "DECEL." in FIG. 10B), the intake air quantity is decreased, and thereby the upper limit inflow EGR gas quantity is decreased. Furthermore, since the EGR gas remains in the intake passage at this time, the cylinder-inflow EGR gas quantity may possibly exceed the upper limit inflow EGR gas quantity at the time of decelerating the engine and/or at the time of reaccelerating the engine (see the period of "ACCEL" in FIG. 10B), thereby possibly causing the misfire.

In the system of the second comparative example shown in FIG. 10C, a combustion deterioration limiting control operation is executed such that the throttle opening degree is reduced at a speed that is lower than an upper limit closing speed at the time of decelerating the engine (see the period of "DECEL." in FIG. 10C). The upper limit closing speed is an upper limit of the closing speed of the throttle valve 21, equal to or below which the normal combustion (combustion without misfire) is possible. In FIG. 10C, a dotted line is shown for illustrative purpose to indicate the upper limit inflow EGR gas quantity of the system of FIG. 10B, in which no misfire-avoidance control operation is executed. In the system of the second comparative example shown in FIG. 10C, the combustion deterioration limiting control operation may be excessively executed in an initial decelerating range (an initial range of the deceleration operation of the engine), in which the cylinder-inflow EGR gas quantity is equal to or below the upper limit inflow EGR gas quantity, so that the fuel consumption may possibly be deteriorated. Furthermore, even when the combustion deterioration limiting control operation is executed, the cylinder-inflow EGR gas quantity may possibly exceed the upper limit inflow EGR gas quantity thereafter, thereby possibly resulting in the generation of the misfire, as indicated by a shaded area (a misfire generating range) in FIG. 10C. Furthermore, the system of the second comparative example shown in FIG. 10C cannot counteract with the case where the EGR gas remains in the intake passage until the time of reaccelerating the engine after the execution of the deceleration of the engine, thereby possibly resulting in the occurrence of the misfire at the time of reacceleration of the engine (see the beginning of the period of "ACCEL" in FIG. 10C).

Unlike the first and second comparative examples discussed above, according to the present embodiment, with reference to FIG. 10D, the cylinder-inflow EGR gas quantity is estimated by using the model, which simulates the behavior of the EGR gas flow quantity, and it is predicted whether the misfire occurs based on the result of the determination of whether the value of the difference between the currently set upper limit inflow EGR gas quantity and the estimated cylinder-inflow EGR gas quantity is smaller than the predetermined threshold value. When it is predicted that the misfire occurs (i.e., when it is predicted that the event of misfire is upcoming), the misfire-avoidance control operation(s)(e.g., the fuel injection quantity increasing control operation, the ignition energy increasing control operation, and/or the gas flow strengthening control operation, the intake air quantity increasing control operation) is executed. Thereby, when it is predicted that the misfire occurs in view of the excessive increase of the cylinder-inflow EGR gas quantity, the misfire-avoidance control operation(s) is executed. Therefore, the occurrence of the misfire caused by the EGR gas at the time of the decelerating the engine and the time of reaccelerating the engine can be limited. In FIG. 10D, a lower dotted line indicates the upper limit inflow EGR gas quantity of the first comparative example, and an upper dotted line indicates the upper limit inflow EGR gas quantity of the second comparative example.

Furthermore, in the present embodiment, the required increase of the upper limit inflow EGR gas quantity is computed based on the difference between the cylinder-inflow EGR gas quantity and the upper limit inflow EGR gas quantity, and the misfire-avoidance control operation(s) is executed under the condition, which corresponds to the required increase of the upper limit inflow EGR gas quantity. Therefore, the condition of executing the misfire-avoidance control operation(s) (e.g., the type of the misfire-avoidance control operation(s), the combination of the misfire-avoidance control operation(s), the control quantity of the misfire-avoidance control operation(s), and/or the execution timing of the misfire-avoidance control operation(s)) can be changed according to the required increase of the upper limit inflow EGR gas quantity, so that the misfire-avoidance control operation(s) can be executed under the condition, which is suitable for achieving the required increase of the upper limit inflow EGR gas quantity.

Furthermore, in the present embodiment, the misfire-avoidance control operation(s) to be executed at the present time is selected from the various types of the misfire-avoidance control operations in view of the influence on the fuel economy, the influence on the driveability, the influence on the emission and the influence on the engine responsiveness of the misfire-avoidance control operation(s). Therefore, it is possible to limit the deterioration of the fuel economy, the deterioration of the driveability and the deterioration of the emission as well as the delay of the engine response upon the execution of the misfire-avoidance control operation(s).

In the above embodiment, the cylinder-inflow EGR gas quantity is computed (estimated) by using the model, which simulates the behavior of the EGR gas flow quantity. However, the method of estimating the cylinder-inflow EGR gas quantity is not limited to this method and may be modified in an appropriate manner. For example, the cylinder-inflow EGR gas quantity may be computed (estimated) based on an output signal of an intake conduit pressure sensor or an output signal of the air flow meter. Furthermore, the quantity of the EGR gas, which remains in the intake conduit 12, may be sensed with a sensor as information of the cylinder-inflow EGR gas quantity (cylinder-inflow EGR gas quantity information).

In the above embodiment, the required increase of the upper limit inflow EGR gas quantity is computed based on the difference between the cylinder-inflow EGR gas quantity and the upper limit inflow EGR gas quantity. However, the present disclosure is not limited to this. For instance, in view of the fact of that the upper limit inflow EGR gas quantity changes in response to the engine operational state (e.g., the intake air quantity), the required increase of the upper limit inflow EGR gas quantity may be computed based on the cylinder-inflow EGR gas quantity and the engine operational state.

In the above embodiment, the present disclosure is applied to the engine that is provided with the supercharger and the low pressure loop (LPL) EGR device 28, which recirculates the EGR gas from the portion of the exhaust conduit 15 located on the downstream side of the catalytic converter 16 to the portion of the intake conduit 12 located on the upstream side of the compressor 19. However, the present disclosure is not limited to such an engine. For example, the present disclosure may be applied to an internal combustion engine that is provided with a super charger and a high pressure loop (HPL) EGR device, which recirculates the EGR gas from a portion of the exhaust conduit located on an upstream side of the exhaust turbine to a portion of the intake conduit located on a downstream side of the throttle valve.

Furthermore, the present disclosure is not limited to the engine, which is provided with the exhaust turbine supercharger (i.e., the turbocharger). For instance, the present disclosure may be applied to an internal combustion engine, which is provided with a mechanical supercharger or an electric supercharger.

Furthermore, the present disclosure is not limited to the engine, which is provided with the supercharger. That is, the present disclosure may be applied to a normal aspiration engine (NA engine), which is not provided with a supercharger.

Additional advantages and modifications will readily occur to those skilled in the art. The present disclosure in its broader terms is therefore not limited to the specific details, representative apparatus, and illustrative examples shown and described.

What is claimed is:

1. A control apparatus for an internal combustion engine that is provided with an exhaust gas recirculation (EGR) device, which recirculates a portion of exhaust gas of the internal combustion engine as EGR gas to an intake passage of the internal combustion engine, the control apparatus comprising:
   a cylinder-inflow EGR gas quantity determining arrangement that estimates or senses a value of a cylinder-inflow EGR gas quantity, which is a quantity of the EGR gas that flows into a cylinder of the internal combustion engine;
   a misfire predicting arrangement that predicts whether misfire occurs based on the value of the cylinder-inflow EGR gas quantity and an operational state of the internal combustion engine;
   a misfire-avoidance control arrangement that executes at least one misfire-avoidance control operation to avoid the misfire when the misfire predicting arrangement predicts that the misfire occurs;
   an upper limit inflow EGR gas quantity computing arrangement that computes an upper limit inflow EGR gas quantity based on the operational state of the internal combustion engine, wherein:
   the upper limit inflow EGR gas quantity is an upper limit of the cylinder-inflow EGR gas quantity of the EGR gas that is combustible in the cylinder without causing the misfire, and the misfire predicting arrangement predicts whether the misfire occurs by comparing the value of the cylinder-inflow EGR gas quantity with the upper limit inflow EGR gas quantity;
   the misfire-avoidance control arrangement computes a required increase of the upper limit inflow EGR gas quantity, which is required to avoid the misfire, based on a difference between the value of the cylinder-inflow EGR gas quantity and the upper limit inflow EGR gas quantity; and
   the misfire-avoidance control arrangement executes the at least one misfire-avoidance control operation under a corresponding condition, which corresponds to the required increase of the upper limit inflow EGR gas quantity.

2. The control apparatus according to claim 1, wherein the misfire-avoidance control arrangement selects the at least one misfire-avoidance control operation from a plurality of misfire-avoidance control operations in view of at least one of fuel economy, driveability, engine responsiveness and engine emission when the misfire-avoidance control arrangement executes the at least one misfire-avoidance control operation under the corresponding condition, which corresponds to the required increase of the upper limit inflow EGR gas quantity.

3. The control apparatus according to claim 1, wherein the misfire-avoidance control arrangement executes the at least one misfire-avoidance control operation, which is selected from:
   a fuel injection quantity increasing control operation, which increases a fuel injection quantity of fuel to be supplied into the cylinder;
   an ignition energy increasing control operation, which increases an ignition energy for igniting the fuel;
   a gas flow strengthening control operation, which strengthens a gas flow in the cylinder; and
   an intake air quantity increasing control operation, which increases an intake air quantity of intake air to be supplied into the cylinder.

4. A control apparatus for an internal combustion engine that is provided with an exhaust gas recirculation (EGR) device, which recirculates a portion of exhaust as of the internal combustion engine as EGR gas to an intake passage of the internal combustion engine, the control apparatus comprising:
   a cylinder-inflow EGR gas quantity determining arrangement that estimates or senses a value of a cylinder-inflow EGR gas quantity, which is a quantity of the EGR gas that flows into a cylinder of the internal combustion engine;
   a misfire predicting arrangement that predicts whether misfire occurs based on the value of the cylinder-inflow EGR gas quantity and an operational state of the internal combustion engine;
   a misfire-avoidance control arrangement that executes at least one misfire-avoidance control operation to avoid the misfire when the misfire predicting arrangement predicts that the misfire occurs;
   the misfire-avoidance control arrangement executes the at least one misfire-avoidance control operation, which is selected from:
   a fuel injection quantity increasing control operation, which increases a fuel injection quantity of fuel to be supplied into the cylinder;

an ignition energy increasing control operation, which increases an ignition energy for igniting the fuel;

a gas flow strengthening control operation, which strengthens a gas flow in the cylinder; and an intake air quantity increasing control operation, which increases an intake air quantity of intake air to be supplied into the cylinder; and when the misfire-avoidance control arrangement executes the intake air quantity increasing control operation as one of the at least one misfire-avoidance control operation, the misfire-avoidance control arrangement executes a torque correcting control operation, which limits a torque change that is caused by the intake air quantity increasing control operation.

5. A control apparatus for an internal combustion engine that is provided with an exhaust gas recirculation (EGR) device, which recirculates a portion of exhaust gas of the internal combustion engine as EGR gas to an intake passage of the internal combustion engine, the control apparatus comprising:

a cylinder-inflow EGR gas quantity determining arrangement that estimates or senses a value of a cylinder-inflow EGR gas quantity, which is a quantity of the EGR gas that flows into a cylinder of the internal combustion engine;

a misfire predicting arrangement that predicts whether misfire occurs based on the value of the cylinder-inflow EGR gas quantity and an operational state of the internal combustion engine; and a misfire-avoidance control arrangement that executes at least one misfire-avoidance control operation to avoid the misfire when the misfire predicting arrangement predicts that the misfire occurs, wherein:

the cylinder-inflow EGR gas quantity determining arrangement estimates the value of the cylinder-inflow EGR gas quantity based on an EGR valve-passing gas flow quantity, which is a quantity of a portion of the EGR gas that passes through an EGR valve of the EGR device; and the misfire predicting arrangement compares the estimated value of the cylinder-inflow EGR gas quantity with an upper limit inflow EGR gas quantity to predict whether the misfire occurs in advance before the portion of the EGR gas, which corresponds to the estimated value of the cylinder-inflow EGR gas quantity, flows into the cylinder to provide an execution time period to the misfire-avoidance control arrangement for executing the at least one misfire-avoidance control operation before the portion of the EGR gas flows into the cylinder in a case where the misfire predicting arrangement predicts that the misfire occurs.

6. A control apparatus for an internal combustion engine that is provided with an exhaust gas recirculation (EGR) device, which recirculates a portion of exhaust gas of the internal combustion engine as EGR gas to an intake passage of the internal combustion engine, the control apparatus comprising:

a cylinder-inflow EGR gas quantity determining arrangement that estimates or senses a value of a cylinder-inflow EGR gas quantity, which is a quantity of the EGR gas that flows into a cylinder of the internal combustion engine;

a misfire predicting arrangement that predicts whether misfire occurs based on the value of the cylinder-inflow EGR gas quantity and an operational state of the internal combustion engine; and a misfire-avoidance control arrangement that executes at least one misfire-avoidance control operation to avoid the misfire when the misfire predicting arrangement predicts that the misfire occurs, wherein:

the cylinder-inflow EGR gas quantity determining arrangement estimates and stores a value of an EGR gas flow quantity of a portion of the EGR gas that is present between a first location of the intake passage, which is on a downstream side of an EGR valve of the EGR device, and a second location of the intake passage, which is on an upstream side of the cylinder, based on an EGR valve-passing gas flow quantity, which is a quantity of the portion of the EGR gas passed through the EGR valve; and the cylinder-inflow EGR gas quantity determining arrangement estimates the value of the cylinder-inflow EGR gas quantity based on the stored value of the EGR gas flow quantity of the portion of the EGR gas.

* * * * *